United States Patent [19]
Schweer et al.

[11] Patent Number: 4,858,007
[45] Date of Patent: Aug. 15, 1989

[54] DIGITAL DATA SLICER CIRCUIT FOR DIGITAL TELETEXT SIGNALS

[75] Inventors: Reiner Schweer, Waldkirch; Manfred Juenke, Gundelfingen; Ulrich K. Sieben, Reute, all of Fed. Rep. of Germany

[73] Assignee: Deutsche ITT Industries GmbH, Freiburg, Fed. Rep. of Germany

[21] Appl. No.: 240,310

[22] Filed: Sep. 6, 1988

[30] Foreign Application Priority Data

Sep. 8, 1987 [EP] European Pat. Off. ........ 87113085.2
Dec. 3, 1987 [EP] European Pat. Off. ........ 87117884.4

[51] Int. Cl.$^4$ ........................ H04N 7/087; H04N 7/08
[52] U.S. Cl. .................................... 358/147; 358/142; 358/146
[58] Field of Search ............... 358/142, 146, 147, 148, 358/153

[56] References Cited

U.S. PATENT DOCUMENTS

| 4,620,227 | 10/1986 | Levin et al. | 358/147 |
| 4,697,211 | 9/1987 | Balaban et al. | 358/153 |
| 4,712,131 | 12/1987 | Tanabe | 358/147 |

FOREIGN PATENT DOCUMENTS

| 0016503 | 3/1980 | European Pat. Off. . |
| 0144457 | 12/1983 | European Pat. Off. . |
| 2164812 | 11/1985 | United Kingdom . |

*Primary Examiner*—James J. Groody
*Assistant Examiner*—Michael D. Parker
*Attorney, Agent, or Firm*—Thomas L. Peterson

[57] ABSTRACT

A digital data slicer circuit causes the slicing level to track a teletext signal in optimum fashion even if the teletext signal has many successive zero crossings. The digital data slicer circuit substantially prevents any lock-in in either of two other, stable states. This is achieved essentially by applying a zero signal via two changeover switches to an accumulator and a sign inverter when many successive zero crossings are detected by a logic circuit that controls the changeover switches.

5 Claims, 2 Drawing Sheets

DIGITAL DATA SLICER CIRCUIT FOR DIGITAL TELETEXT SIGNALS

FIELD OF THE INVENTION

The present invention is in the field of television and, more particularly, the present invention relates to a digital data slicer circuit for separating and recovering digital teletext signals from the composite color signal demodulated in color-television receivers and digitized with the aid of a clock signal.

BACKGROUND OF THE INVENTION

A data slicer circuit for separating and recovering digital teletext data is disclosed in EP-A 144 457, corresponding to U.S. Pat. No. 4,656,513. The disclosure of U.S. Pat. No. 4,656,513 is incorporated herein by reference. According to the fundamental idea of that application and that patent, the slicing level is determined by subtracting the teletext signal from the start-value-containing composite color signal. Since the exact shape of the teletext signal is unknown or is not reproducible, a corresponding reference signal is generated and subtracted, so that an error signal is obtained. Integration of the error signal provides the unsmoothed slicing level, which still contains high-frequency interfering signals. During the generation of the reference signal, those teletext-signal amplitudes which occur shortly before and shortly after a 0 to 1 transition are suppressed, so that only the peak values of the teletext signal are evaluated.

It turns out that in teletext signals with many successive 0 to 1 transitions, i.e., zeroes, the prior art arrangement leads to unacceptable errors in the reference signal.

SUMMARY OF THE INVENTION

The present invention provides a remedy to the above-described problem. The object of the invention described herein is to improve the prior art arrangement in such a way that, even if the teletext signal has many successive zero crossings, a substantially error-free reference signal will be generated, thus ensuring optimum tracking of the slicing level. The invention makes it highly unlikely for the improved arrangement, particularly at small signal amplitudes, to leave its desired state, so that it can no longer change to either of the two other, then stable states, which would render the separation of the teletext information impossible. Thus, the arrangement of the present invention does not lock in to any state other than the desired state.

DETAILED DESCRIPTION OF THE PREFERRED EMBODIMENT

Figure 1:
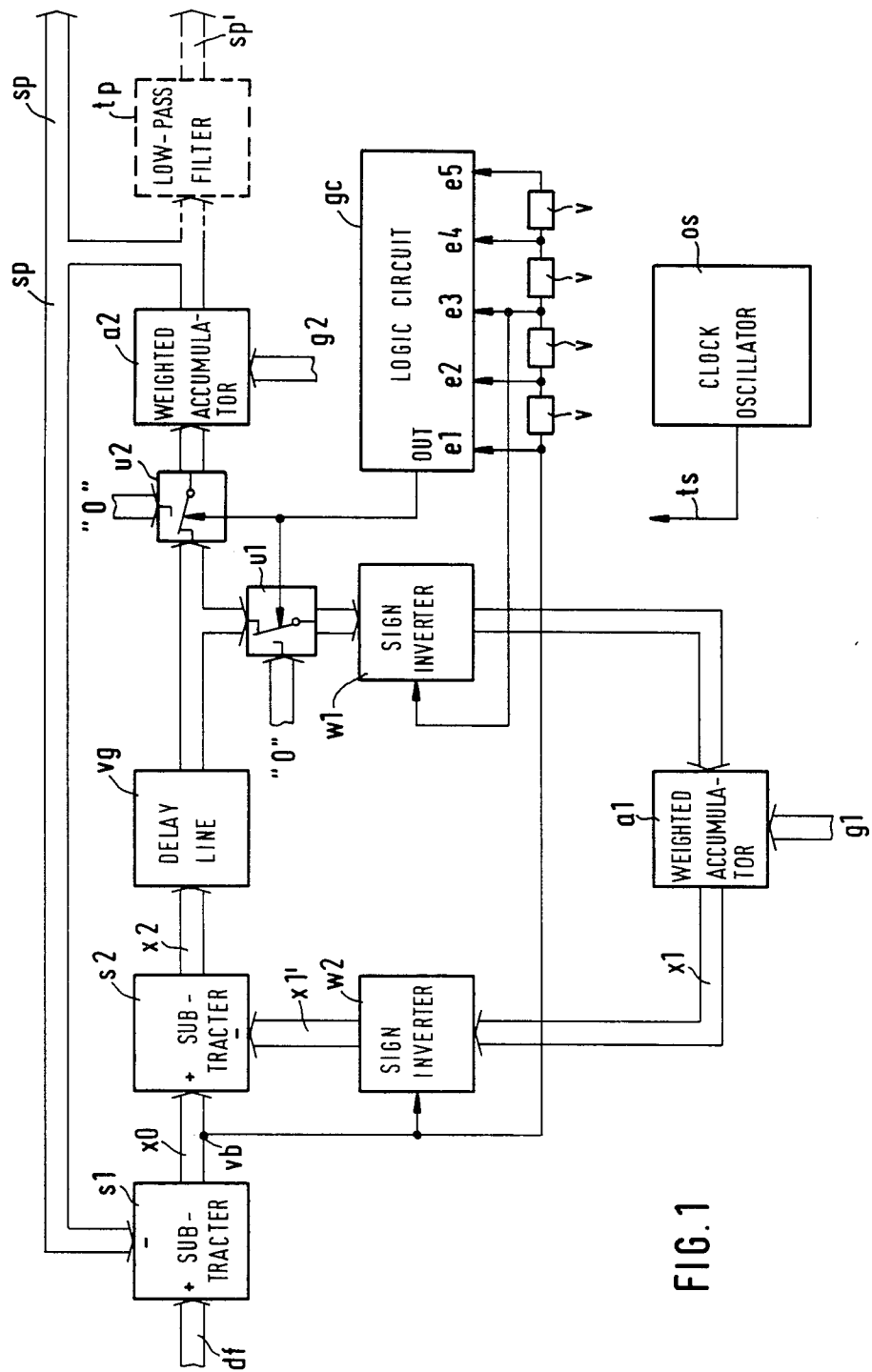
FIG. 1 is a block diagram of an embodiment of the invention.

In the highly schematic block diagram of FIG. 1, the square and rectangular symbols represent digital circuit stages which process digital signals in parallel. If necessary, use is made of the so-called pipeline technique, which is advantageous particularly in the case of adders, subtracters, multipliers, etc.

The aforementioned parallel processing of multi-digit words is also symbolized in FIG. 1 by the fact that the interconnecting leads between the individual subcircuits are drawn as stripe-like lines where such multi-digit words occur. The solid lines commonly used in circuit diagrams represent leads over which a single-digit word is transferred, for example.

The input to the arrangement of FIG. 1 is assumed to be the start-value-containing composite color signal df as is described in the printed publications mentioned above. The "composite color signal" is the usual composite color signal in a television receiver. In the present case, this signal is a suitably digitized signal that has been converted into digital words by an analog-to-digital converter (not shown) in a conventional manner by being sampled by means of a clock signal ts from a clock oscillator os. If necessary, the subcircuits of the arrangement of FIG. 1, particularly the delay elements and the delay line described below, are also clocked by the clock signal ts.

The clock oscillator os can be any suitable oscillator circuit, including the driver stages and any pulse-shaping stages necessary to control the individual subcircuits. The pulse-shaping stages are advantageous, for example, if the arrangement of the present invention is to be implemented with insulated-gate field-effect transistor integrated circuit technology, using the so-called two-phase system. A two-phase system is a clock system in which the entire circuit is operated with a single square-wave clock signal and the inverse clock signal derived therefrom.

The start-value-containing composite color signal df, after being digitized by means of the clock signal ts, is applied to the minuend input of a first subtracter s1. The first subtracter s1 has an output that provides a digital signal x0. The output of the first subtracter s1 is connected to the minuend input of a second subtracter s2. The second subtracter s2 has an output that provides a signal x2. The signal x2 is coupled through a delay line vg to the first input of a first changeover switch u1 and to the first input of a second changeover switch u2. The delay provided by the delay line vg is equal to twice the period of the clock signal ts. The output of the first changeover switch u1 is coupled to the input of a first sign inverter w1. The first sign inverter w1 has an output that is connected to the input of a first weighted accumulator a1. A first weighting factor g1, having a magnitude less than one, is applied to the first weighted accumulator a1 so that the first weighted accumulator a1 acts as an integrator. The output of the first weighted accumulator a1 is coupled to the input of a second sign inverter w2. The second sign inverter w2 has an output that provides a signal x1. The output of the second sign inverter w2 is connected to the subtrahend input of the second subtracter s2.

The output of the second changeover switch u2 is coupled to the input of a second weighted accumulator a2, which has the weighting factor g2. The weighting factor g2 is preferably different from the weighting factor g1, and is less than one so that the second weighted accumulator a2 acts as an integrator. The second weighted accumulator a2 has an output that is coupled to the subtrahend input of the first subtracter s1. The output of the second accumulator a2 provides a signal sp, which is the as yet unsmoothed slicing level. If necessary, the unsmoothed slicing level signal sp can be smoothed, for example, by means of a first-order, low-pass filter tp. The output of the first-order, low-pass filter tp provides a smoothed slicing level sp'.

The second input of each of the two changeover switches u1, u2 are fed by the digital word "0", which corresponds to the numerical value zero, so that the two changeover switches u1, u2 transfer either the output signal of the delay element vg or the "0" digital word to the first sign inverter w1 and the second accumulator a2, respectively. The transfer is effected by means of an output signal from a logic circuit gc, as is illustrated by a line running to the switching contacts of the two changeover switches u1, u2 from the logic circuit gc. The switching contacts for the two changeover switches u1, u2 are shown in the positions in which the output signal of the delay element vg is transferred from the respective first inputs to the outputs of the changeover circuits in the manner described.

The logic circuit gc has five inputs e1, e2, e3, e4, e5. A delay element v is connected between each the first input e1 and the second input e2, the second input e2 and the third input e3, the third input e3 and the fourth input e4, and the fourth input e4 and the fifth input e5. Each of the delay elements v provides a delay equal to the period of the clock signal ts. The first input e1 of the logic circuit gc and a control input of the second sign inverter w2 are controlled by the sign bit vb of the output of the first subtracter s1. A control input of the first sign inverter w1 is controlled by the signal at the third input e3 of the logic circuit gc. The control inputs control the two sign inverters w1 and w2 in such a manner that when the sign bit vb indicates a negative word, the two sign inverters w1, w2 are put in their respective inverting conditions. In other words, when the two sign inverters are in their inverting conditions, a positive digital word applied at the respective inverter input appears as the corresponding negative digital word at the inverter output, and vice versa. Depending on the method used to represent positive and negative numbers, the two sign inverters w1, w2 will be conventional one's or two's complement inverters, for example. The two delay elements v between the first input e1 and the second input e2 and between the second input e2 and the third input e3 cause the switchover of the first sign inverter w1 to be delayed by two clock periods with respect to the signal x0. The two clock periods correspond to the delay through the delay element vg so that the switchover of the first inverter w1 takes place exactly at the instant the digital word x0 whose sign is applied to the input e1 appears at the output of the delay element vg.

The logic circuit gc provides at its output a binary level which causes the first inputs of the changeover switches u1, u2 to be connected to the respective outputs when the signals of the following table appear at its five inputs e1, e2, e3, e4, e5, where 0 and 1 are the two binary levels, and x indicates that either of the two binary levels may appear:

| e1 | e2 | e3 | e4 | e5 |
|----|----|----|----|----|
| x  | 0  | x  | 0  | x  |
| x  | 1  | x  | 1  | x  |
| 0  | 1  | 1  | 0  | x  |
| 1  | 0  | 0  | 1  | x  |
| x  | 0  | 1  | 1  | 0  |
| x  | 1  | 0  | 0  | 1  |

With the aid of this table, the logic can be constructed by those skilled in the art in the usual manner, taking account of known minimization laws. It can be seen that the logic circuit gc operates to suppress the passage of sample values near the zero-crossings of the start-value-containing composite color signal df so that such possibly erroneous values of the output quantity x2 are not added to the first weighted accumulator a1 or the second weighted accumulator a2. Rather, for certain of the sample values near the zero-crossings, the value of zero is added to the weighted accumulators rather than the quantity x2. Thus, the suppressed quantities x2 do not affect the magnitudes of the outputs of the two accumulators.

Figure 2:
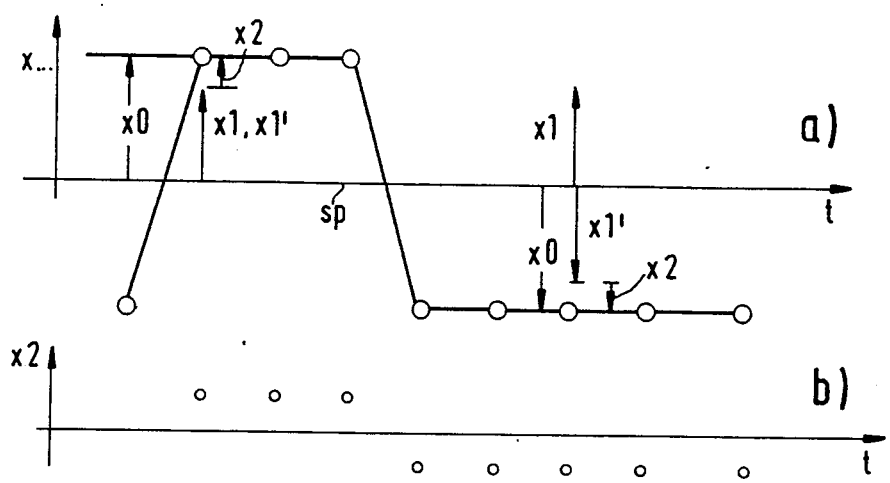
FIGS. 2 and 3 are schematic timing diagrams illustrating the operation of the circuit in accordance with the invention.
Figure 3:
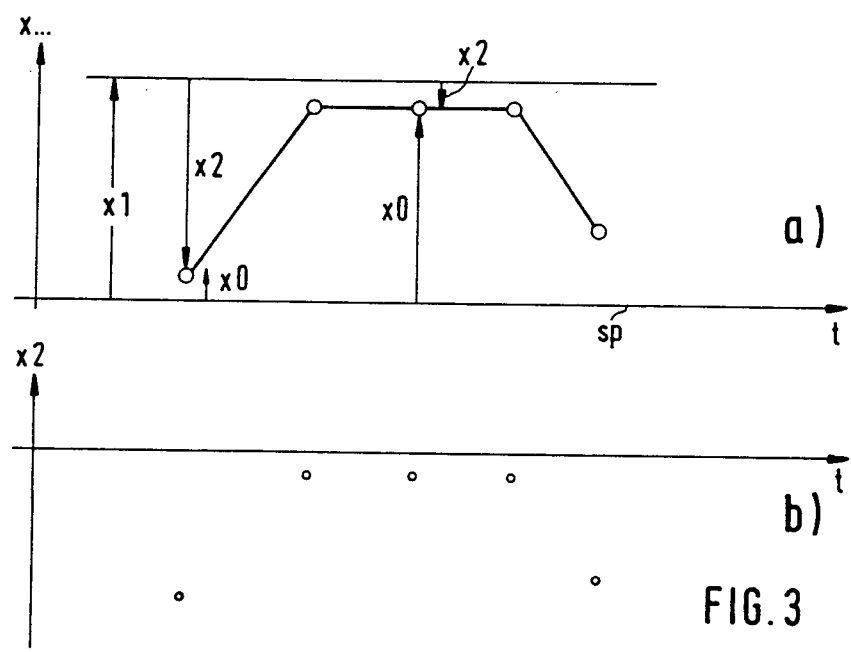

FIGS. 2 and 3 explain the operation of the slicer circuit in the presence of an ideal teletext signal (FIG. 2) and an actual, band-limited teletext signal (FIG. 3). The large dots (FIGS. 2a, 3a) represent the sample values df of the teletext signal corrected by the slicing level sp, and the small dots (FIGS. 2b, 3b) represent the output values x2 of the subtracter s2 corresponding to these sample values for a predetermined content x1 of the accumulator a1. The directions of the arrows in FIGS. 2a, 3a indicated how the output value x2 of the subtracter a2 is derived from the signed values x0, x1 and x1.

In the case of an idealized teletext signal (FIG. 2), whose sample values are only x0, the output quantity x2 of the subtracter s2 is comparatively small and varies only little. In contrast, the output quantity x2 can assume large absolute values in the case of a band-limited signal (FIG. 3) if sample values near zero occur at the application of the input value x0 to the second subtracter s2. These large absolute values are shown as peaks in the waveform of the signal x2 in FIG. 3band they represent an undesired, interfering signal that may lead to the above-mentioned disadvantageous lock-in in the arrangement described in the printed publications referenced above. The peaks are therefore suitably suppressed by the logic circuit gc, whose operation is specified in detail by the above table.

In contrast to the present invention, in the prior art arrangement described in the printed publications referenced above, the case of FIG. 3 would lead to the above-mentioned disadvantageous lock-in. Thus, the present invention provides a significant advantage over the prior art arrangement.

What is claimed is:

1. A digital data slicer circuit for separating and recovering digital teletext signals from the demodulated composite color signals in color-television receivers and digitized at a sampling rate determined by a clock signal having a clock period, said color composite color signal being a start-value-containing color composite signal, said digital data slicer circuit providing a data slicing signal, said digital data slicer circuit comprising:

a first subtracter having a minuend input and a subtrahend input, said start-value-containing color composite signal applied to the minuend input of said first subtracter, said first subtracter having an output;

a second subtracter having a minuend input and a subtrahend input, said minuend input of said second subtracter coupled to receive the output of said first subtracter;

a digital delay line having an input and an output, said input of said digital delay line coupled to receive the output of said second subtracter and to provide a delayed signal output, said digital delay line providing a predetermined delay from said input to said delayed signal output that is twice said clock period;

a first changeover switch and a second changeover switch, each of said first and second changeover switches having a first input, a second input and an output, said first and second changeover switches further including a respective control input, said first inputs of each changeover switch connected to the output of said digital delay line to receive the delayed signal output therefrom, the second inputs of the two changeover switches being provided with a digital word corresponding to zero ("0");

a first sign inverter having a data input and an output, said first sign inverter further having a control input responsive to first and second logic levels, said data input of said first sign inverter connected to receive the output of said first changeover switch, said first sign inverter responsive to said first logic level on said control input to provide data at said output equal to the data at said data input, said first sign inverter responsive to said second logic level on said control input to provide inverted data on said output equal to the complement of the data on said data input, said control input of said first sign inverter coupled to receive a signal corresponding to the sign of said output of said first subtracter, said signal delayed by two clock periods from said output of said first subtracter so that when said output of said first subtracter is negative, said first sign inverter will provide inverted data on said output of said first sign inverter two clock periods later;

a first weighted accumulator having a data input, a weighting input and an output, said data input of said first weighted accumulator connected to said output of said first sign inverter, said weighting input receiving a first predetermined weighting factor, said output of said first weighted accumulator being responsive to the weighted sum of the data presented to the input of said first weighted accumulator from said first sign inverter;

a second sign inverter having a data input and an output, said second sign inverter further having a control input responsive to first and second logic levels, said data input of said second sign inverter connected to receive the output of said first accumulator, said second sign inverter responsive to said first logic level on said control input to provide data at said output equal to the data at said data input, said second sign inverter responsive to said second logic level on said control input to provide inverted data on said output equal to the complement of the data on said data input, said output of said second sign inverter connected to said subtrahend input of said second subtracter, said control input of said second sign inverter coupled to receive a signal responsive to the sign of the output of said first subtracter so that when said output of said first subtracter is negative, said second sign inverter will provide inverted data on said output of said second sign inverter;

a second weighted accumulator having a data input, a weighting input and an output, said data input of said second weighted accumulator connected to said output of said second changeover switch, said weighting input receiving a second predetermined weighting factor, said output of said second weighted accumulator being responsive to the weighted sum of the data presented to the input of said second weighted accumulator from said second changeover switch, said second weighted accumulator operating to integrate said output from said second changeover switch, said output of said second weighted accumulator being an unfiltered data slicing output signal, said output of said second weighted accumulator connected to said subtrahend input of said first subtracter;

a logic circuit having a first input (e1), a second input (e2), a third input (e3), a fourth input (e4), a fifth input (e5) and an output, said first input connected to receive said signal responsive to the sign of the output of said first subtracter; and first, second, third and fourth delay elements, each having an input and an output, the output of each of said delay elements delayed from its respective input by one clock period, said first delay element connected to receive said signal responsive to the sign of the output of said first subtracter, said output of said first delay element coupled to said second input of said logic circuit and to said input of said second delay element, said output of said second delay element coupled to said third input of said logic circuit and to said input of said third delay element, said output of said third delay element coupled to said fourth input of said logic circuit and to said input of said fourth delay element, said output of said fourth delay element coupled to said fifth input of said logic circuit, the output of said logic circuit provided as the control inputs to said first and second changeover switches such that when said output of said logic circuit has first stage, said first and second changeover switches connect their respective first inputs to their respective outputs, and when said logic circuit has a second state, said first and second changeover switches connect their respective second inputs to their respective outputs, said logics circuit responsive to the first, second, third, fourth and fifth inputs of said logic circuit to provide said first output state when one of the combinations set forth in the following table are present on said inputs, where 0 and 1 are the two binary levels, and x indicates that either of the two binary levels may appear:

| e1 | e2 | e3 | e4 | e5 |
| --- | --- | --- | --- | --- |
| x | 0 | x | 0 | x |
| x | 1 | x | 1 | x |
| 0 | 1 | 1 | 0 | x |
| 1 | 0 | 0 | 1 | x |
| x | 0 | 1 | 1 | 0 |
| x | 1 | 0 | 0 | 1 | said output of said logic circuit controlling said first and second changeover switches to suppress selected ones of the sample values near zero crossings of the start-value-containing composite color signal thereby preventing large changes in the data applied to the input of said second weighted accumulator.

2. A digital data slicer circuit as defined in claim 1, further including a low-pass filter having an input and an output, said input connected to said output of said second weighted accumulator, said output being a smoothed data slicing signal.

3. A digital data slicer circuit as defined in claim 1 wherein said first weighting factor and said second weighting factor are different from each other.

4. A digital data slicer circuit as defined in claim 1, wherein said circuit is implemented in insulated-gate field-effect transistor integrated circuit technology using two-phase clocking.

5. A digital data slicer circuit for separating and recovering digital teletext signals from a demodulated color composite signal in a color television receiver, said demodulated color composite signal digitized at a rate determined by a clock signal having a clock period, said digital data slicer circuit comprising:

a first subtracter that receives said color composite signal and a data slicing signal and that provides an output signal equal to the difference between said color composite signal and said data slicing signal;

a second subtracter having a first input connected to receive the output of said first subtracter and having a second input connected to receive a feedback signal, said second subtracter providing an output signal equal to the difference between the data on said first input and said second input;

a digital delay line that provides a delayed output signal equal to the output of said second subtracter delayed in time by two of said clock periods;

a switch having a first and second input and an output, said switch controlled by a first control signal, said first input connected to receive the delayed output signal from said digital delay line, said second input connected to receive a digital word having a digital value of zero, said switch responsive to a first value of said first control signal to connect the value of said first control signal to connect the second input to the output;

a first sign inverter connected to the output of said switch, said first sign inverter responsive to a second control signal to selectively provide an output signal equal to the output of said switch for a first value of said second control signal and to selectively provide an output signal equal to the complement of the output of said switch for a second value of said second control signal, said second control signal being the sign bit of said output of said first subtracter delayed by two of said clock periods;

a first accumulator connected to receive the output of said first sign inverter during each clock period and to provide an output equal to the weighted sum of said output of said first sign inverter;

a second sign inverter connected to the output of said first accumulator, said second sign inverter responsive to a third control signal to selectively provide an output signal equal to the output of said first accumulator for a first value of said third control signal and to selectively provide an output signal equal to the complement of the output of said first accumulator for a second value of said third control signal, said third control signal being the sign bit of the output of said first subtracter;

a second accumulator connected to the output of said switch to receive the output of said switch during each clock period and to provide an output equal to the weighted sum of said output of said switch, said output of said second accumlator being said data slicing signal, said output of said second accumlator further being provided as the subtrahend input of said first subtracter; and a control circuit having a output that provides said first control signal that controls said switch, said control circuit having a plurality of inputs, one of said inputs coupled to receive a signal corresponding to the sign bit of said output of said first subtracter, the others of said plurality of inputs providing signals corresponding to the sign bit of said first subtracter delayed in time by a multiple of said clock period, said output of said control circuit responsive to combinations of said signals on said inputs so that said first control signal causes said switch to couple said second input of said switch to said output at selected times proximate to the zero crossings of said color composite input signal so that said digital value of zero is coupled to said first sign inverter and said second accumulator.

* * * * *